Patented Sept. 7, 1954

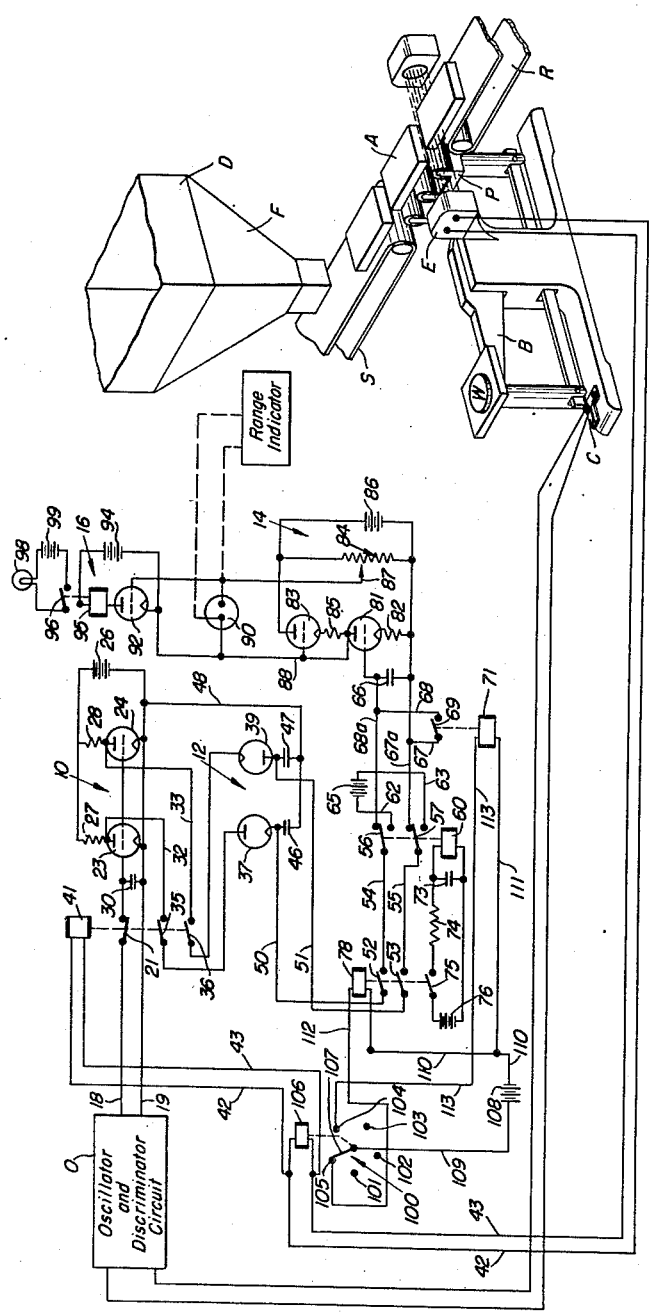

2,688,740

UNITED STATES PATENT OFFICE 2,688,740

RANGE COMPUTER

Roger L. Merrill and William Hecox, Columbus, Ohio, assignors, by mesne assignments, to The Exact Weight Scale Company, Columbus, Ohio, a corporation of Ohio Application June 26, 1951, Serial No. 233,588

26 Claims. (Cl. 340—213)

Our invention relates to a range computer. It has to do, more particularly, with a range computing system which will determine the difference in value between an object having the greatest value and an object having the smallest value in a group or sample of objects. More specifically, our invention is embodied in an electronic range-computing device which receives an input voltage proportionate to a desired physical characteristic of an object and determines the difference in value of that physical characteristic as between the two objects having the greatest dissimilarity of said physical characteristic in a particular group of objects.

The range computer of this invention has many applications. The device also may be used to compare the range value with a selected value, and if the range value exceeds such selected value, it may be concluded that the means which imparts the physical characteristic to the objects having such values is functioning improperly.

This range value is also of worth in that successive range values may be recorded over a period of time for successive groups of objects, and the resultant data will show the inherent range of variability of the objects.

Such range value will provide a measure of the variability of a given universe, and with the average value for that universe, which may be obtained by means of the device disclosed in the co-pending application of Merrill and Hecox, entitled "Averaging System," Serial No. 218,123, filed March 29, 1951, may be used to determine the frequency distribution curve for such universe.

The range device may be used in conjunction with the averaging device disclosed in said copending application. However, it is capable of other uses, where it is desired to determine the range existent between the two objects in a particular group of objects, having the greatest dissimilarity in value.

It is the principal object of our invention to provide a system which will determine the range existent between the two objects having the greatest dissimilarity in value for a group of objects, each of which objects has such a value.

It is another object of our invention to provide a system of the type indicated above which not only determines this value of range, but compares it with an arbitrary range value, and translates such value into energy which can be measured and indicated so that such information can be used to determine if the means which is imparting such value to the articles is functioning properly.

For purposes of simplification, and ease of presentation, the application of our invention will be described only in connection with the determination of the range of the variable which is weight. However, it is to be understood that other variables, such as linear measurements, electromotive forces, color, etc., may be effectively dealt with by means of the device hereinafter described. In describing our device in connection with the variable weight, the device will be described in connection with a weight-checking machine existent on the market at the present time called the "Selectrol," which is manufactured by the Exact Weight Scale Company of Columbus, Ohio. This machine is disclosed in detail in the U. S. patent of Flannagan et al., 2,323,023, of June 29, 1943. Shown in such patent, the "Selectrol" actually comprises a continuous conveyor type of weighing device which check-weighs an article or package as it moves along a conveyor. It has associated with it controls which shunt packages which are overweight beyond a certain desired limit, and underweight beyond a certain desired limit, onto separate slides or conveyors to be carried to points where such overweight and underweight conditions in those packages may be corrected. Packages which are within the prescribed weight tolerances are permitted to be carried on the necessary conveying system to further operation such as wrapping or boxing, etc. The "Selectrol" indicates whether a particular package which passes thereover, is of a selected desired weight or the quantity of the subject package is overweight or underweight, as compared to such desired weight.

There is obtainable from the "Selectrol" a value of voltage which is proportionate to the weight of the quantity of product above or below a selected desired weight for each package which passes through such weight-checking machine. In this machine, a negative voltage is developed if the total weight of the package is above the desired weight, and a positive voltage is developed if the total weight of the package is below the desired weight. A photoelectric cell circuit is preferably associated with the weight-checking machine so that as each package leaves the weighing portion of the conveyor, it creates an actuating impulse by interrupting a light beam in a photoelectric cell circuit. These two factors, the difference in weight of a particular packaged product from a desired weight, as represented by a particular voltage value which may be either positive or negative, and an impulse from the interruption of a photoelectric cell circuit, are utilized as control factors by the device in which our invention is embodied.

While the device disclosed herein is particularly adapted for use with the weight-checking machine described above, it is not limited thereto, but may be used with various other checking or measuring machines which will supply a positive or negative voltage value or a proportional voltage value corresponding to either the difference in the desired variable from a selected value, or the total value of such a variable. Moreover, while it is indicated above that a photo electric cell circuit is utilized to supply a control impulse to the device in which our invention is embodied, it should be readily apparent that mechanical devices or other devices may be used to supply such an impulse.

The device hereinafter described and illustrated in the accompanying drawing may be used to obtain such range values representing the difference between the objects being most dissimilar in value in each group of successive groups of objects.

With reference to the drawing, we have illustrated basic elements of a weight-checking machine of the "Selectrol" type. This machine comprises a weighing beam B of the over-and-under weight type which has a counterweight or weight platform W at one end and the commodity portion P at the other end that is part of a conveyor line. The packages A to be check-weighed are supplied by a conveyor section S of the conveyor line which carries the filled packages away from a dispenser D. The filler spout F of dispenser D can be controlled in a suitable manner to vary the volume of material supplied to each package. Another conveyor section R of the continuous line removes the check-weighed packages A from the conveyor section P. Associated with the counterweight end of the beam B is a condenser C which forms a part of an oscillator and discriminator circuit O of the type disclosed in Patent No. 2,323,023. Movement of the plates of condenser C, caused by movement of beam B, results in a variation in the oscillating frequency of circuit O and results in an output voltage. The packages A move continuously and successively across the conveyor section P and the beam B will move to a position of equilibrium corresponding to the weight of that package. The conveyor section P may have an electric eye or photoelectric relay system E associated therewith so that as each article A passes from the conveyor section P, the light beam thereof is broken.

Our computer is shown as comprising an amplifying circuit indicated generally at 10, a memory circuit indicated generally at 12, a comparing circuit indicated generally at 14, and an indicating circuit indicated generally at 16. The input to the range device is through lines 18 and 19. By means of these lines 18 and 19, the voltage signals from successive packages on the associated measuring or checking machine, are introduced into the device. For example, lines 18 and 19 may be connected to the oscillator and discriminator circuit O of the "Selectrol" for receiving the voltage output thereof. These connections may be at the points 57a and 58a of the circuit disclosed in Patent No. 2,323,023. The nature of this voltage input to the range device will depend upon the particular package being check-weighed on the weight-checking machine, and will be proportionate to the amount of variation in weight of the package from a desired weight and may be a positive or a negative value. For purposes of simplification, it will be assumed, in describing the operation of this device hereinafter, that the voltage input value will be proportionate to the weight deviation of each package being weighed from a selected norm wherein the voltage will be either positive or negative.

Input line 18 is connected through switch 21 in series to the grids of the triodes 23 and 24. Input line 19 is connected in series to the respective cathodes of these tubes and is also connected to a source of electrical energy 26. The positive side of this source of electrical energy 26 is connected through resistances 27 and 28, respectively, to the plates of triodes 23 and 24. A condenser 30 is connected across lines 18 and 19 between switch 21 and the first triode 23. This essentially comprises the amplifying circuit 10 which is directly connected to the input from the weight-checking machine.

The plates of triodes 23 and 24 are connected by means of lines 32 and 33, respectively, through the switches 35 and 36, respectively, to the plate of a diode 37, and the cathode of a diode 39, respectively. These diodes 37 and 39 are elements of the memory circuit 12. Switches 21, 35 and 36 are ganged together and are adapted to be operated by a relay 41. Switch 21 is closed, as shown, when switches 35 and 36 are open, and, conversely, switch 21 is open when switches 35 and 36 are closed. The relay 41 is normally deactuated, and, consequently, switch 21 is normally closed, while switches 35 and 36 are normally open. Relay 41 may be connected to the photoelectric cell circuit of the "Selectrol," and if such is the case, the leads 42 and 43 of the relay coil 44 are connected to the photoelectric relay system E, so that relay coil 41 will receive an actuating impulse from the interruption of the light beam of the photoelectric cell circuit by successive packages A leaving conveyor section P. However, instead of an electrical impulse for actuating relay 41, a mechanical linkage (not shown) may be provided between the weighing portion of the weight-checking machine and switches 21, 35 and 36. The cathode of diode 37 and the plate of diode 39 are connected, respectively, to the condensers 46 and 47, which are of equal size. These condensers are connected in series and are also connected by means of a line 48 to input line 19. The cathode of diode 37 and the plate of diode 39 are also connected, respectively, by means of lines 50 and 51, through the switches 52 and 53, respectively, and the lines 54 and 55, respectively, to the double-throw single-pole switches 56 and 57, respectively. Switches 56 and 57 are adapted to be actuated by a relay 60, and, when actuated in the downward position, are in contact with the lines 62 and 63, respectively, which are in series with a source of current 65. When switches 56 and 57 are in an upward position, as shown, they are connected to a condenser 66 by means of the lines 67a and 68a, respectively. Condenser 66 may be shorted out by means of the lines 67, 68 which are connected to the respective lines 67a and 68a and the switch 69, which is connected to lines 67 and 68 and may be closed by actuation of a relay 71. The coil of the relay 60 is in parallel with a condenser 73 and is in series with a resistance 74, a switch 75, and a source of current 76. Switches 52, 53, and 75 are normally open, as shown, but may be closed by actuation of the relay indicated at 78. Condenser 66 is connected to the grid of a triode 81, which triode is in series with a triode 83, and the two triodes comprise one leg of a voltage bridge circuit which forms a part of the comparing circuit 14. The other leg of the voltage bridge circuit is composed of a resistance 84 to which is connected the other side of condenser 66. Condenser 66 is also connected to the cathode of triode 81 through a resistance 82. A source of current 86 is provided across resistance 84 for triodes 81 and 83. The plate of triode 81 is connected to the cathode of triode 83 as well as to the grid thereof. Thus, a line 88 is connected to the plate of triode 81, to the grid of triode 83, and through a resistance 85 is connected to the cathode of triode 83. The movable contact 87 on resistance 84 and the line 88, are connected across an output jack indicated at 90. In place of this output jack there may be a meter, which meter will indicate the difference in value, if any, between the voltage in the triode leg 83 of the voltage bridge as compared with the voltage in the resistance leg 84 thereof. The movable contact 87 is also connected to the grid of a triode 92, while the line 88 is connected to the cathode thereof and is also connected to a source of the current 94. This triode 92 is an element of the indicating circuit 16. The source of current 94 is connected through the coil of a relay 95 to the plate of triode 92. Adapted to be actuated by relay 95 is a switch 96 which is in series with a warning light 98 and a source of current 99. In place of warning light 98, a buzzer or gong may be provided.

Every package A passing through the weight-checking machine will break the light beam of the photoelectric cell circuit and thereby actuate relay 41. It is desirable that certain packages in the series being check-weighed actuate the relay 78 and that certain other packages in the series actuate relay 71. For this purpose we provide a stepping switch indicated generally by numeral 100. This stepping switch is actuated by means of the coil 106 which is connected directly to the leads 42 and 43 from the photoelectric cell system E of the weight-checking machine. The stepping switch shown is a five contact stepping switch but it is to be understood that it could as well have ten, fifteen, or any desired number of contacts, depending upon the number of items in each group of the series being investigated. The coil 106 actuates the contact arm 107 which is moved step-by-step in a counterclockwise direction successively into contact with the respective contacts 101, 102, 103, 104 and 105 which are uniformly angularly spaced. The contact arm 107 is connected to a source of current 108 by means of line 109. The source of current 108 is connected by line 110 to one side of the coil of relay 78 and by line 111 to one side of the coil of relay 71. The contact point 105 is connected by line 112 to the other side of the coil of relay 78; the contact points 101, 102 and 103 are blanks; and the contact point 104 is connected by line 113 to the other side of the coil of relay 71. It will be apparent that by using more than one stepping switch or by using more than one source of current various modifications of this particular portion of our device may be made.

The operation of our device is as follows:

As previously indicated, every object leaving the checking machine will actuate the relay 41 by means of the photoelectric circuit. Assuming it is desired to find the value of range between the object having the smallest value and the object having the largest value, in a selected group, the last object of the group will actuate relay 78. Moreover, the next to the last object in the group will actuate relay 71.

Let us assume that it is desired to determine the range value existent in a group of five objects having arbitrary values of —2, 0, 2, 1, and —3. Let us assume also that these values are introduced into this device in the order listed. We know that the range between the largest and the smallest packages (packages 2 and —3) is 5. Let us assume that our range device is used in conjunction with the "Selectrol" or similar weight-checking machine and that the variable is weight. As indicated above, every package passing through the weight-checking machine will interrupt the photoelectric cell circuit and thereby actuate relay 41 by means of lines 42 and 43. Let us assume that the output or indicated weight from the machine is introduced into the range device at lines 18 and 19. Let us also assume that every fifth package passing through the machine will actuate the relay indicated at 78, while the package preceding the fifth package in every group, or the fourth package in any one group, will actuate relay 71.

This sequence of operations is accomplished by means of the stepping switch 100. The movable contact arm 107 of this switch is rotated in a counterclockwise direction one step for each succeeding article leaving the weight-checking machine since relay coil 106 is connected to lines 42 and 43 that are connected to the photoelectric cell circuit. In the position shown where arm 107 contacts point 105, to which it is moved by the fifth package of the group, a circuit is completed from the source of current 108 to the coil of relay 78, which relay is actuated by every sample; in this case, the samples being every fifth package. The coil for relay 71 is connected to the contact point next immediately preceding the position of the contact arm 107, as shown, that is point 104, so that relay 71 is actuated just prior to the actuation of relay 78 that is, by the fourth package. Relay 41 is actuated by every package since it is connected in parallel with relay 106.

As the first package A passes through the weight-checking machine, a voltage will be generated proportional to the weight of the package. This voltage will cause a charge to be placed on condenser 30 proportional thereto, since condenser 30 is connected to lines 18 and 19 and switch 21 is closed. Thereafter, the first package will continue on through the weight-checking machine, will actuate relay 41, and will cause switch 21 to open and switches 35 and 36 to close. Let us also assume that there are equal and opposite charges on condensers 46 and 47, the charge on each of these condensers being greater than any possible corresponding charge of a package passing through the weight-checking machine. The manner in which this is accomplished will be described hereinafter. The first package, having a value of —2, has caused a charge to be placed on condenser 30. This also causes a voltage to exist across triodes 23 and 24, which voltage, though positive, will be proportionate to the value of voltage obtained from the checking machine and will be amplified into a usable value, perhaps by a factor of ten, or whatever is suitable for the particular installation. This voltage across the two triodes 23 and 24, upon closing of switches 35 and 36, will also exist across condenser 46 and diode 37, and condenser 47 and diode 39, since the two condensers are connected to line 19 by means of line 48. Moreover, in the case of the diode 39, the cathode thereof will be negative with respect to its plate which is connected to condenser 47, since such condenser has previously been charged with a charge greater than the charge produced by the first package passing through the checking machine. Since the charge on condenser 47 is greater than the charge produced as a result of the first package passing through the checking machine, current will be permitted to flow through diode 39 until a charge is placed upon condenser 47 proportionate to the weight of the first package. In the case of diode 37, the plate thereof will be more positive than its cathode, since condenser 46 has previously been charged to a value opposite to the charge on condenser 47, and current will flow through diode 37 until a charge is placed upon condenser 46 proportionate to the weight of the first package and equal to the charge on condenser 47, each condenser consequently being charged to a value proportionate to the value —2, representative of the first package passing through the checking machine. Moreover, the potential existent between the cathode of diode 37 and the plate of diode 39 will be zero, since the condensers are equally, but no longer oppositely, charged. Thereafter the second package, representing a value of 0, will pass through the checking machine, relay 41 will be actuated, and a bias will be placed across diodes 37 and 39 proportionate to 0. Because lines 32 and 33 are connected to the plates of triodes 23 and 24, an input to the grids of these triodes which is more positive will result in a proportionate voltage which is more negative. Since the bias on the condensers 46 and 47 is already proportionate to —2, the cathode of diode 37 will be positive with respect to the plate thereof, and, consequently, the charge representing the value of —2 on condenser 46 will remain the same. However, in the case of condenser 47, the plate of diode 39 will be positive with respect to the cathode thereof, and, consequently, condenser 47 will increase in value until it has a value proportionate to 0. This will mean that a difference in potential will exist between the cathode of diode 37 and the plate of diode 39, proportionate in value to 2, or the difference between —2 and 0, this representing the range of the two most dissimilar packages in the group at this point. Thereafter, the third package will pass through the checking machine and, by the same mechanism described above, a bias will be placed on tubes 37 and 39 and condensers 46 and 47, proportionate to a value of 2. In the case of diode 37, this will have no effect on condenser 46, since the plate of diode 37 will be more negative than the cathode thereof, and, consequently, no current will flow through the diode. However, in the case of diode 39, the plate thereof will be more positive than the cathode thereof, and condenser 47 will, consequently, assume a charge proportionate to the value of 2. At this point, the potential between the cathode of diode 37 and the plate of diode 39 will be proportionate to 4, or the difference between —2 and 2. Thereafter, the fourth package will pass through the checking machine and a bias will be placed on the memory circuit 12 proportionate to a value of 1. Here again, in the case of diode 37, since the cathode thereof will be more positive than the plate thereof, there will be no current flow, and, in the case of diode 39, since the plate thereof will be less positive than the cathode thereof, because the plate represents a value proportionate to 1, while the cathode merely represents a value proportionate to 2, there will be no current flow. Consequently, package four will have no effect upon the range in the memory circuit 12. This is as it should be, because the fourth package lies between the smallest package in the group, having a value of —2, and the largest package in the group, having a value of 2, which have been sent through the checking machine.

The fourth package performs an additional function when passing through the checking machine. In addition to actuating relay 41, the same photoelectric cell circuit, by means of the stepping switch 100, is utilized to actuate relay 71. This closes switch 69 and shorts out condenser 66, and merely constitutes a means to prepare condenser 66 of comparing circuit 14 to have a charge placed thereon. Thereafter, the fifth package passes through the checking machine and causes a bias representing a value of —3, to be placed across the memory circuit 12. In the case of diode 37, since —3 is less than —2, the plate of diode 37 will be more positive than the cathode thereof, and condenser 46 will assume a charge representing a value of —3. In the case of diode 39, however, since the value of —3 is less than the value of 2, the plate thereof will be negative with respect to the cathode thereof and condenser 47 will remain the same. There is now existent a potential difference, between the cathode of diode 37 and the plate of diode 39, equal to 5, which represents the range of the sample of five articles. The fifth package, in addition to actuating relay 41, also causes relay 78 to be actuated. Actuation of relay 78 closes switches 52, 53 and 75, thereby causing the potential existent between the cathode of diode 37 and the plate of diode 39 to charge condenser 66 to a value proportionate thereto. This is accomplished by the circuit in the condition shown. Closing of switch 75 causes relay 60 to be actuated. However, due to the lag caused by condenser 73 and resistance 74, relay 60 is actuated a fraction of a second after switches 52 and 53 are closed. Consequently, condenser 66 is permitted to be charged before switches 57 and 56 are moved downwardly. With switches 56 and 57 closed in a downwardly direction, source of current 65 is placed across condensers 46 and 47, thereby placing equal and opposite charges on these condensers. The polarity of source of current 65 is such that the charge on condenser 47 will be positive, and the charge on condenser 46 will be negative. Therefore, the plate of diode 39 will be positive with respect to the cathode thereof. Moreover, the charge on condenser 47 will be greater than any possible bias which can be placed across condenser 47 and diode 39 resultant from the input to this device. The range device is now ready to receive the first package of the next group of packages passing through the checking machine.

The charge on condenser 66 causes a variation in voltage between the triodes 81 and 83, proportionate to the charge on such condenser. If the voltage so created is different than the voltage at the variable contact 87 in the resistance leg 84, an output will result which may be measured at the output terminal 90. Moreover, if it is less than the voltage at the variable contact 87 in the resistance leg 84, it will cause current to flow through the indicating circuit 16 by energization of the grid of triode 92, which will thereby cause actuation of relay 95, closing of switch 96, and lighting of alarm light 98, or actuation of an audible alarm.

If desired, the output jack 90 can be connected to a range indicator or recorder as indicated by the dotted lines.

This, it will be seen that there has been disclosed a range device which will determine the difference in value between the two objects having the greatest dissimilarity of a particular physical characteristic in a specified group of such objects. Moreover, this device functions to compare such difference with an arbitrary value, and if the difference exceeds such value, the device measures such excess and actuates a warning device.

Having thus described our invention, what we claim is:

1. In combination with means for checking a series of successive groups of articles in regard to a measurable physical characteristic thereof which may vary and including electronic means for creating an output voltage if such characteristic thereof does vary; means for obtaining the difference in value between the two articles in each group having the greatest dissimilarity of said physical characteristic for each of successive groups of said articles; said last-named means comprising an electronic circuit connected to said first-named electronic means for receiving the said output voltage from said first-named means as an input voltage, said circuit including a memory circuit section which receives the input voltage, and provides a group-range voltage proportionate to the difference between the input voltages having the greatest dissimilarity in value for each said group, and a comparing circuit section which compares said group-range voltage with a selected standard and provides an output voltage if it differs therefrom.

2. The combination of claim 1 wherein said comparing circuit section includes adjustable means for selecting the standard of comparison.

3. The combination of claim 1 wherein said electronic circuit also includes an indicating circuit which indicates if such output voltage differs from said standard.

4. The combination of claim 3 wherein said indicating circuit section includes an alarm means.

5. The combination of claim 3 wherein said electronic circuit includes an amplifying circuit section which first receives and amplifies the output voltage from said first-named electronic means.

6. In combination with means for checking a series of successive groups of articles in regard to a measurable physical characteristic thereof which may vary and including electronic means for creating an output voltage as such characteristic of any succeeding articles does vary from a selected norm; means for obtaining the difference in value between the two articles in each group having the greatest dissimilarity of said physical characteristic for each of successive groups of said articles; said last-named means comprising an electronic circuit connected to said first-named electronic means for receiving the said output voltage from said first-named means as an input voltage, said electronic circuit including an amplifying circuit section which receives the input voltage, a memory circuit section which receives the amplified voltage, and provides a group-range voltage proportionate to the difference between the input voltages having the greatest dissimilarity in value for each said group, and a comparing circuit section which compares said group-range voltage, when it is supplied thereto by the memory section, with a selected standard and provides an output voltage if it differs therefrom.

7. The combination of claim 6 wherein said electronic circuit also includes an indicating circuit which indicates if such output voltage differs from said standard.

8. In combination with means for checking a series of successive groups of articles in regard to a measurable physical characteristic thereof which may vary and including electronic means for creating an output voltage as such characteristic of any succeeding article does vary from a selected norm; means for obtaining the difference in value between the two articles in each group having the greatest dissimilarity of said physical characteristic for each of successive groups of said articles; said last-named means comprising an electronic circuit connected to said first-named electronic means for receiving the said output voltage from said first-named means as an input voltage, said electronic circuit including an amplifying circuit section which receives the input voltage, a memory circuit section which receives the amplified voltage, and provides a group-range voltage proportionate to the difference between the input voltages having the greatest dissimilarity in value for each said group, and a comparing circuit section which compares said group-range voltage, when it is supplied thereto by the memory section, with a selected standard and provides an output voltage if it differs therefrom, said electronic circuit also including an indicating circuit which indicates if such output voltage differs from said standard, a normally closed switch for controlling the supply of input voltage to said amplifying circuit section and a normally open switch for controlling the supply of amplified voltage to said memory circuit section, and means actuated by each article as it leaves said checking means for simultaneously actuating said switches to open the first to prevent the further supply of further input voltage to the amplifying circuit section and to supply the amplified input voltage to the memory circuit section.

9. The combination of claim 8 wherein said last-named means includes a relay coil for actuating said switches.

10. The combination of claim 9 wherein said last-named means also includes a photoelectric cell circuit connected to said relay coil.

11. The combination of claim 8 wherein switches are provided for controlling the flow of voltage from the memory circuit to the comparing circuit, and a counting means for actuating said switches selectively as certain articles in the group being checked leave said checking device.

12. The combination of claim 11 wherein said switches are actuated by relay coils, and said counting means comprises a stepping switch which is connected to said coils for operating them sequentially.

13. The combination of claim 12 wherein said stepping switch includes an actuating relay coil, and means actuated by each article as it leaves said checking means for actuating said coil.

14. The combination of claim 13 wherein said last-named means comprises a photoelectric cell circuit connected to said relay coil.

15. The combination of claim 14 wherein said photoelectric cell circuit also actuates a relay coil which actuates said switches which control the supply of input voltage to said amplifying circuit section and the supply of amplified voltage to said memory circuit section.

16. The combination of claim 15 wherein said comparing circuit section includes adjustable means for selecting the standard of comparison.

17. The combination of claim 16 wherein said indicating circuit section includes indicating means for indicating if the output voltage from the comparing circuit differs from said standard and alarm means for giving an alarm if it does so differ.

18. In combination with means for checking a series of successive groups of articles in regard to a measurable physical characteristic thereof which may vary and including electronic means for creating an output voltage as such characteristic of any succeeding article does vary from a selected norm; means for obtaining the difference in value between the two articles in each group having the greatest dissimilarity of said physical characteristic for each of successive groups of said articles; said last-named means comprising an electronic circuit connected to said first-named electronic means for receiving the said output voltage from said first-named means as an input voltage, said electronic circuit including an amplifying circuit section which receives the input voltage, a memory circuit section which receives the amplified voltage, and provides a group-range voltage proportionate to the difference between the input voltages having the greatest dissimilarity in value for each said group, and a comparing circuit section which compares said group-range voltage, when it is supplied thereto by the memory section, with a selected standard and provides an output voltage if it differs therefrom, a normally closed switch for controlling the supply of input voltage to said amplfying circuit section and a normally open switch for controlling the supply of amplified voltage to said memory circuit section, and means actuated by each article as it leaves said checking means for simultaneously actuating said switches to open the first to prevent the further supply of further input voltage to the amplifying circuit section and to supply the amplified input voltage to the memory circuit section.

19. The combination of claim 18 wherein said last-named means includes a relay coil for actuating said switches.

20. The combination of claim 19 wherein said last-named means also includes a photoelectric cell circuit connected to said relay coil.

21. The combination of claim 18 wherein switches are provided for controlling the flow of voltage from the memory circuit to the comparing circuit, and a counting means for actuating said switches selectively as certain articles in the group being checked leave said checking device.

22. The combination of claim 21 wherein said switches are actuated by relay coils, and said counting means comprises a stepping switch which is connected to said coils for operating them sequentially.

23. The combination of claim 22 wherein said stepping switch includes an actuating relay coil, and means actuated by each article as it leaves said checking means for actuating said coil.

24. The combination of claim 23 wherein said last-named means comprises a photoelectric cell circuit connected to said relay coil.

25. The combination of claim 24 wherein said photoelectric cell circuit also actuates a relay coil which actuates said switches which control the supply of input voltage to said amplifying circuit section and the supply of amplified voltage to said memory circuit section.

26. The combination of claim 25 wherein said comparing circuit section includes adjustable means for selecting the standard of comparison.

References Cited in the file of this patent

UNITED STATES PATENTS

| Number    | Name         | Date          |
|-----------|--------------|---------------|
| 1,983,388 | Moore        | Dec. 4, 1934  |
| 2,343,240 | Molins et al.| Mar. 7, 1944  |
| 2,456,499 | Fritzinger   | Dec. 14, 1948 |
| 2,477,395 | Sunstein     | July 26, 1949 |
| 2,556,374 | Koechel      | June 12, 1951 |